(12) United States Patent
Cuevas Ramirez et al.

(10) Patent No.: US 12,081,440 B2
(45) Date of Patent: Sep. 3, 2024

(54) METHOD OF OPERATING A TELECOMMUNICATIONS NETWORK

(71) Applicant: BRITISH TELECOMMUNICATIONS PUBLIC LIMITED COMPANY, London (GB)

(72) Inventors: Maria Cuevas Ramirez, London (GB); Stephen Johnson, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 18/551,412

(22) PCT Filed: Feb. 22, 2022

(86) PCT No.: PCT/EP2022/054369
§ 371 (c)(1),
(2) Date: Sep. 20, 2023

(87) PCT Pub. No.: WO2022/199965
PCT Pub. Date: Sep. 29, 2022

(65) Prior Publication Data
US 2024/0098027 A1 Mar. 21, 2024

(30) Foreign Application Priority Data
Mar. 23, 2021 (GB) ...................... 2104059

(51) Int. Cl.
*H04L 47/22* (2022.01)
*H04L 47/31* (2022.01)
*H04W 76/10* (2018.01)

(52) U.S. Cl.
CPC .............. *H04L 47/22* (2013.01); *H04L 47/31* (2013.01); *H04W 76/10* (2018.02)

(58) Field of Classification Search
CPC ......... H04L 47/22; H04L 47/31; H04W 76/10
See application file for complete search history.

(56) References Cited

U.S. PATENT DOCUMENTS

| 10,397,758 | B2 | 8/2019 | Albasheir et al. |
| 2019/0357082 | A1 | 11/2019 | Kim et al. |

(Continued)

FOREIGN PATENT DOCUMENTS

| EP | 2 728 802 | 5/2014 |
| EP | 3 547 747 | 10/2019 |

(Continued)

OTHER PUBLICATIONS

International Search Report and Written Opinion of the ISA for PCT/EP2022/054369 dated Jul. 1, 2022, 12 pages.

(Continued)

*Primary Examiner* — Will W Lin
(74) *Attorney, Agent, or Firm* — Nixon & Vanderhye P.C.

(57) ABSTRACT

A method of operating a telecommunications network (100), said telecommunications network being accessible to a User Equipment (UE) (102) and comprising a cellular telecommunications network (104-2) and a fixed-access telecommunications network (104-1), the method comprising the steps of: providing a set of user plane functions for processing user traffic for the UE, said set comprising at least two user plane functions; providing a combined user plane function (210) for processing user traffic for the UE according to the set of user plane functions; following establishing a network connection between the UE and the cellular telecommunications network via the fixed-access telecommunications network (510), identifying inefficient routing of user traffic associated with the UE (520), said inefficient routing comprising routing user traffic to at least the set of user plane functions; in response to identifying inefficient routing, re-routing user traffic associated with the UE to the (Continued)

combined user plane function so as to process the user traffic at the combined user plane function instead of at the set of user plane functions (530).

21 Claims, 5 Drawing Sheets

(56) References Cited

U.S. PATENT DOCUMENTS

| | | | | |
|---|---|---|---|---|
| 2020/0100303 | A1* | 3/2020 | Sankar | H04W 76/12 |
| 2020/0314024 | A1 | 10/2020 | Peng et al. | |
| 2020/0336940 | A1* | 10/2020 | Salkintzis | H04W 28/085 |
| 2021/0243826 | A1* | 8/2021 | Hoffmann | H04W 76/14 |
| 2021/0307091 | A1* | 9/2021 | Nallusamy | H04L 12/185 |
| 2021/0359926 | A1* | 11/2021 | Miklós | H04L 43/0817 |
| 2022/0078857 | A1* | 3/2022 | Kim | H04W 76/10 |
| 2022/0377637 | A1* | 11/2022 | Tang | H04W 4/24 |
| 2022/0377645 | A1* | 11/2022 | Muñoz De La Torre Alonso | H04W 40/30 |
| 2023/0146807 | A1* | 5/2023 | Padebettu | H04L 12/4633 370/389 |
| 2023/0199480 | A1* | 6/2023 | Tao | H04L 67/1021 370/338 |
| 2023/0209621 | A1* | 6/2023 | Olvera-Hernandez | H04W 76/12 370/329 |

FOREIGN PATENT DOCUMENTS

| | | |
|---|---|---|
| WO | 2016/075149 | 5/2016 |
| WO | 2019/032972 | 2/2019 |
| WO | 2019/196860 | 10/2019 |
| WO | 2019186504 A1 | 10/2019 |
| WO | 2019/223852 | 11/2019 |
| WO | 2020034552 A1 | 2/2020 |
| WO | 2020/072652 | 4/2020 |
| WO | 2020/169170 | 8/2020 |
| WO | 2020/232404 | 11/2020 |
| WO | 2021/163590 | 8/2021 |
| WO | 2022/098696 | 5/2022 |

OTHER PUBLICATIONS

Broadband Forum: "SD-420 R2 5G Fixed Mobile Convergence Study", 3GPP Draft; SD-420R2, 3rd Generation Partnership Project (3GPP), Mobile Competence Centre; 650, Route Des Lucioles; F-06921 Sophia-Antipolis Cedex; France, Sep. 9, 2018, 107 pages.
Combined Search and Examination Report for GB2104059.7 dated Aug. 10, 2021, 7 pages.
Jennifer Andreoli-Fang et al., "Network Convergence", A Technical Paper prepared for SCTE-ISBE, 2018, 25 pages.
International Search Report and Written Opinion of the International Searching Authority dated Jan. 31, 2022, issued for International Application No. PCT/EP2021/081988 (16 pages).
International Search Report and Written Opinion of the International Searching Authority dated Jan. 31, 2022, issued for International Application No. PCT/EP2021/082432 (20 pages).
Patents Act 1977: Examination Report under Section 18(3) dated Dec. 15, 2022, issued for GB2019989.9 (4 pages).
Patents Act 1977: Combined Search and Examination Report under Sections 17 and 18(3) dated Nov. 9, 2023, issued for GB2308043.5 (5 pages).
International Preliminary Report on Patentability dated Jan. 30, 2023, issued for International Application No. PCT/EP2021/081988 (19 pages).
Written Opinion of the International Preliminary Examining Authority dated Nov. 7, 2022, issued for International Application No. PCT/EP2021/081988 (10 pages).
Patents Act 1977: Combined Search and Examination Report under Sections 17 and 18(3) dated Jun. 1, 2021, issued for GB2019989.9 (8 pages).
Patents Act 1977: Combined Search and Examination Report under Sections 17 and 18(3) dated Jun. 1, 2021, issued for GB2019986.5 (7 pages).
Patents Act 1977: Examination Report under Section 18(3) dated Dec. 15, 2022, issued for GB2019986.5 (4 pages).
3GPP TS 23.316 V16.5.0 (Sep. 2020) 3rd Generation Partnership Project; Technical Specification Group Services and System Aspects; Wireless and wireline convergence access support for the 5G System (5GS) Release 16); Sections 4.10, 4.12, Annex A (83 pages).
3GPP TR 23.716 v16.0.0 (Dec. 2018) 3rd Generation Partnership Project; Technical Specification Group Services and System Aspects; Study on the Wireless and Wireline Convergence for the 5G system architecture (Release 16); Section 4.2 (184 pages).
Patents Act 1977: Search Report under Section 17 dated Nov. 9, 2023, issued for GB2308041.9 (5 pages).
International Preliminary Report on Patentability dated Jan. 30, 2023, issued for International Application No. PCT/EP2021/082432 (26 pages).
Written Opinion of the International Preliminary Examining Authority dated Nov. 7, 2022, issued for International Application No. PCT/EP2021/082432 (11).
Motorola Mobility, Lenovo, "Various Updates of ATSSS Conclusions", 3GPP Draft, SA WG2 Meeting #129bis, S2-1812620, Nov. 26-30, 2018, West Palm Beach, USA (6 pages).
3GPP TS 24.193 V16.2.0 (Dec. 2020) Technical Specification, $3^{rd}$ Generation Partnership Project, Technical Specification Group Core Network and Terminals, 5G System, Access Traffic Steering, Switching and Splitting (ATSSS), Stage 3, (Release 16), Dec. 10, 2020 (51 pages).
Draft Report for TSG SA meeting #82; Secretary TSG SA (Maurice Pope, MCC); TSG SA Meeting #SP-83, Mar. 20-22, 2019, Shenzhen, China; 3GPP TSG SA Meeting #82, Dec. 12-14, 2018, Sorrento, Italy (181 pages).
3GPP TR 23.793 V16.0.0 (Dec. 2018) Technical Report, $3^{rd}$ Generation Partnership Project, Technical Specification Group Services and System Aspects, Study on access traffic steering, switch and splitting support in the 5G system architecture (Release 16), Dec. 19, 2018 (114 pages).
3GPP TR 23.716 V16.0.0 (Dec. 2018) Technical Report, $3^{rd}$ Generation Partnership Project, Technical Specification Group Services and System Aspects, Study on the Wireless and Wireline Convergence for the 5G system architecture (Release 16), Dec. 19, 2018 (184 pages).

* cited by examiner

METHOD OF OPERATING A TELECOMMUNICATIONS NETWORK

CROSS-REFERENCE TO RELATED APPLICATIONS

This application is the U.S. national phase of International Application No. PCT/EP2022/054369 filed Feb. 22, 2022 which designated the U.S. and claims priority to GB 2104059.7 filed Mar. 23, 2021, the entire contents of each of which are hereby incorporated by reference.

FIELD OF INVENTION

The present invention relates to a method of operating a telecommunications network, and in particular to a method for efficiently routing user traffic, as well as to a telecommunications network therefor.

BACKGROUND

Network convergence is the reformation of disparate telecommunications networks so that they may operate, in effect, as a single unified network. An example includes the integration of a fixed-access broadband network with a wireless wide-area cellular telecommunications network.

The 3rd Generation Partnership Project (3GPP) defines a set of standards that relate to $5^{th}$ Generation telecommunications network (5G networks). Such 5G networks are designed so that a 5G core network may be accessed by multiple forms of access network. Accordingly, User Equipment (UE) may connect to the 5G core network via cellular (3GPP) or non-cellular (non-3GPP) access networks using the same signalling mechanisms defined in the set of 5G standards. Any access network that is used to connect to the 5G core network that is not standardised by the 3GPP is known as a non-3GPP network (of which a common example comprises a wireless local area network that uses Wi-Fi® and Digital Subscriber Line (DSL) or Fibre-To-The-Premises (FTTP) access networks).

The 3GPP defines two ways in which a UE may connect to the 5G core network via a non-3GPP access network—untrusted and trusted access. Trusted access is where an access network is known to, and trusted by, the 5G core network, and untrusted access is where the access network is unknown to the 5G core network. Untrusted and trusted access is detailed in 3GPP Technical Specification 23.501, Version 16.6.0, and in particular at §§ 4.2.8, 8.2 and 8.3, the contents of which are herein incorporated by reference.

A UE may connect to the 5G core network via more than one access network simultaneously, such as by using both cellular and non-cellular access networks, in a mode commonly known as "hybrid access". An example of hybrid access includes a first access connection via a cellular access network and a second access connection via a fixed-access broadband network. In hybrid access mode, data traffic over each access network may be bonded together so that the traffic for the UE is split and delivered on a packet-by-packet basis via each different access network. The hybrid access function in the 3GPP 5G standards is realised in the Multi-Access Packet Data Unit (MA-PDU) Session capability. For any IP flow that is mapped to a MA-PDU Session, the 5G core network ensures that an application running on the UE and its associated application server running in the Data Network (DN) see a single IP address for the UE regardless of which access network the data traffic traverses.

Figure 1:
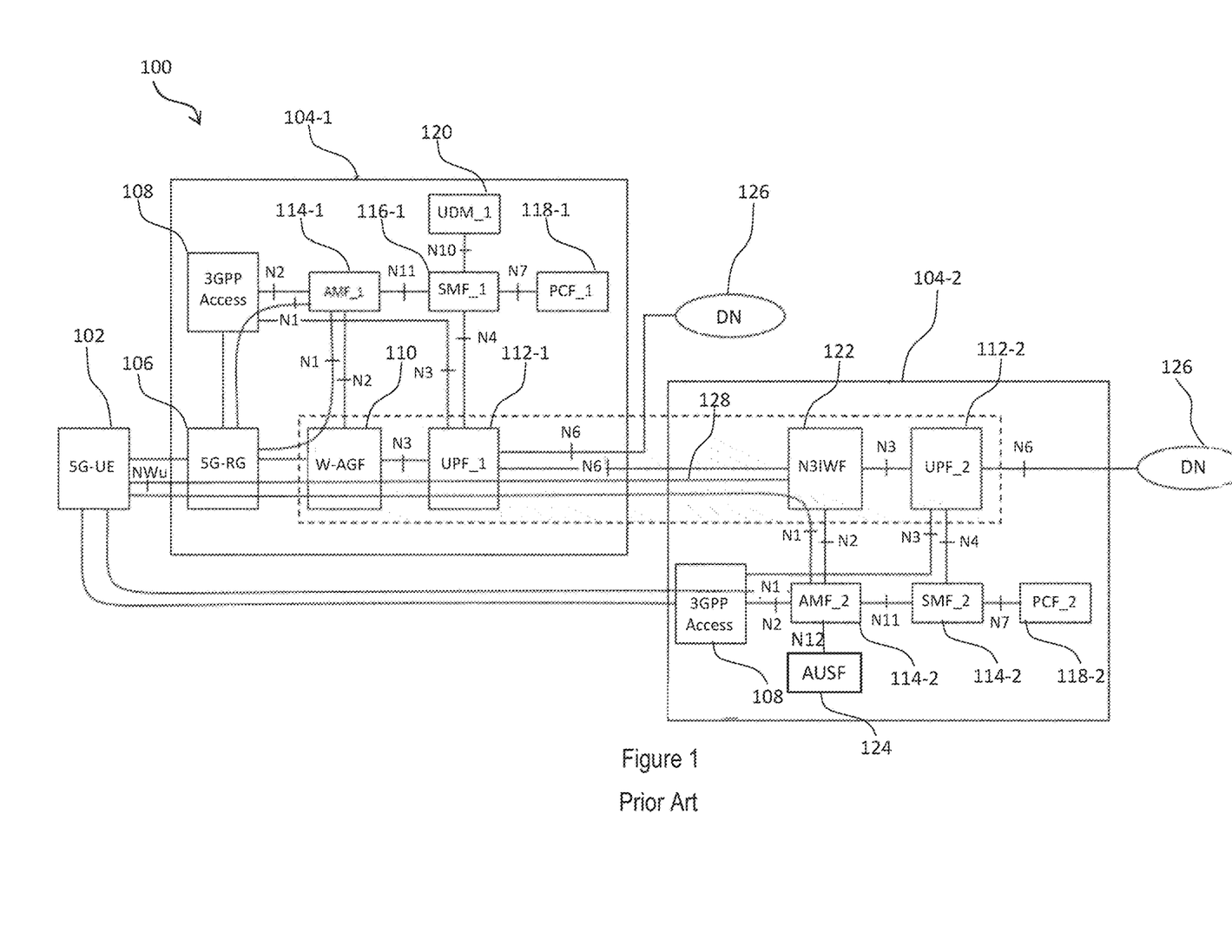
FIG. 1 shows a prior art example of a telecommunications network.

FIG. 1 is a schematic diagram of a prior art example of a 5G telecommunications network 100, in which a UE 102 accesses the telecommunications network in a known manner. In overview, the telecommunications network comprises, at least, the following network components:
- as part of a non-3GPP network portion 104-1, a/an:
    - 5G (hybrid access) Residential Gateway (RG) 106;
    - 3GPP access point 108;
    - Access Gateway Function (AGF) 110
    - Fixed Broadband (FBB) User Plane Function (UPF) 112-1;
    - Access Management Function (AMF) 114-1;
    - Session Management Function (SMF) 116-1;
    - Policy Control Function (PCF) 118-1;
    - Unified Data Management (UDM) 120; and
- as part of a 3GPP network portion 104-2, a/an:
    - Non-3GPP Interworking Function (N3IWF) 122;
    - 3GPP access point 108;
    - Converged Broadband (CBB) User Plane Function (UPF) 112-2;
    - Access Management Function (AMF) 114-2;
    - Session Management Function (SMF) 116-2;
    - Policy Control Function (PCF) 118-2;
    - Authentication Server Function (AUSF) 124.

The Residential Gateway (RG) 106 is a form of customer premises equipment (typically residing in a home or office environment) and provides network access between a UE and a 5G core network; as such, the RG is a non-3GPP access point. The RG supports both cellular and fixed-access network connection to the 5G network, and may therefore facilitate hybrid access. The RG is available to be in the form of an untrusted or trusted access point.

The UE 102 is therefore available to connect to the telecommunications network 100 by connecting to the 3GPP access point 108 and/or the RG 106 (which in turn may also connect to the 3GPP access point 108). Connecting to the RG 106 provides access to the non-3GPP network portion 104-1, whereas connecting to the 3GPP access point 108 provides access to the 3GPP network portion 104-2.

In the scenario shown in and described with reference to FIG. 1, the 5G standards cause the non-3GPP network portion 104-1 effectively to be treated as a separate network to the 3GPP network portion 104-2, even if both networks 104 are under the control of the same operator. As a result, user traffic from the UE 102 that traverses the RG 106 is serially routed (via the non-3GPP network portion 104-1, via an IPSec tunnel 128) through a plurality of user plane functions, namely the: AGF 110; FBB UPF 112-1; N3IWF 122; and CBB UPF 112-2. Each user plane function must process (in substantially the same manner) user traffic as a result of inbound and outbound transportation of user traffic, including for example decapsulation, encapsulation and routing. Increasing the number of user plane functions through which user traffic is routed increases the overall amount of processing performed. Since some of the processing duplicated across the user plane functions, routing to a plurality of user plane functions may cause inefficient utilisation of (often limited) processing resources in the telecommunications network, an increase in latency, and increased operating costs.

The same problem may also arise when the RG 106 is in the form of a trusted non-3GPP access point (albeit that user traffic is routed to a Trusted Network Gateway Function, TNGF (not shown in FIG. 1), rather than to the N3IWF 122).

It is an aim of the present invention to at least alleviate some of the aforementioned problems.

STATEMENTS OF INVENTION

According to a first aspect of the present invention, there is provided: a method of operating a telecommunications network, said telecommunications network being accessible to a User Equipment, UE, and comprising a cellular telecommunications network and a fixed-access telecommunications network, the method comprising the steps of: providing a set of user plane functions for processing user traffic for the UE, said set comprising at least two user plane functions; providing a combined user plane function for processing user traffic for the UE according to the set of user plane functions; following establishing a network connection between the UE and the cellular telecommunications network via the fixed-access telecommunications network, identifying inefficient routing of user traffic associated with the UE, said inefficient routing comprising routing user traffic to at least the set of user plane functions; in response to identifying inefficient routing, re-routing user traffic associated with the UE to the combined user plane function so as to process the user traffic at the combined user plane function instead of at the set of user plane functions.

Preferably, the set of user plane functions comprises a N3IWF and a FBB UPF, and optionally an AGF, a CBB UPF and/or a N3IWF or a TNGF. Optionally, the inefficient routing comprises routing user traffic only to the set of user plane functions. The network connection may be via a trusted or an untrusted network. Preferably, the combined user plane function comprises network subfunctions (and optionally virtualised network subfunctions) for performing, at least, the same processing of user traffic as the set of user plane functions. Preferably, the network subfunctions are collocated. Preferably, the combined user plane function (and therefore all of the constituent virtual network functions) is identifiable by means of only a single network address. Preferably, the combined user plane function is provided as a single entity. Preferably, inefficient routing comprises routing to, at least, every user plane function in the set of user plane functions. Preferably, as used herein, the terms "routing" (in particular in relation to "inefficient routing") connotes a decision (or policy) to route traffic according to a particular network path and/or sending, or having sent, such traffic according to said decision, and therefore need not require the traffic to have been sent. Preferably, the method further comprises the step of transmitting user traffic to the combined user plane function. Optionally, the user traffic is routed using hybrid access. Preferably, the user traffic is communicated using both cellular and non-cellular (or fixed-access) sessions, and wherein the re-routing is performed for both the cellular and the non-cellular sessions.

Preferably, the set of user plane functions comprises one user plane function in each of the cellular and the fixed-access telecommunications networks.

Preferably, the combined user plane function is provided only as part of the cellular telecommunications network.

Preferably, the fixed-access telecommunications network comprises an Access Gateway Function, AGF, and wherein the combined user plane function comprises an interface with said AGF for communicating user traffic.

Preferably, the cellular telecommunications network comprises a Data Network, DN, and wherein the combined user plane function comprises an interface with said DN for communicating user traffic. Preferably, the combined user plane function comprises only two interfaces for user plane traffic. Preferably, the fixed-access and cellular telecommunications networks each comprise a control plane function, and wherein the combined user plane function comprises an interface for each of said control plane functions, and more preferably comprises only two interfaces for control plane traffic.

Preferably, the cellular telecommunications network comprises a Non-3GPP Interworking Function, N3IWF, and/or a Trusted Network Gateway Function, TNGF, and wherein identifying inefficient routing comprises identifying addressing of the user traffic to the N3IWF or TNGF, and more preferably by identifying establishment, or a request for establishment, of a connection between the UE and the N3IWF or TNGF, and still more preferably of a tunnel (e.g. IPSec) therebetween. Preferably, an identity of the N3IWF or TNGF is determined by a (private) DNS lookup function, and wherein inefficient routing is identified in dependence on the identity of the N3IWF or TNGF.

Preferably, the fixed-access telecommunications network and the cellular telecommunications network each comprise a User Plane Function, UPF, and wherein the set of user plane functions comprises at least one of said User Plane Functions. A used herein, a "User Plane Function, UPF" (note capitalisation) is preferably as defined by the 3GPP set of standards on 5th Generation (5G) networks.

Preferably, the step of identifying inefficient comprises identifying a destination and/or a source within the telecommunications network of the user traffic.

Preferably, the step of identifying inefficient is performed prior to transmitting the user traffic according to the identified inefficient routing.

Preferably, the method further comprises the steps of: transmitting the user traffic to the set of user plane functions; tagging user traffic with a unique tag by at least one of the user plane function in the set; and wherein identifying inefficient routing comprises identifying the presence of the tag/s.

Preferably, re-routing to the combined user plane function comprises moving a session anchor associated with the user traffic for the UE from the set of user plane functions to the combined user plane function. Preferably, session anchors for both a cellular and fixed-access network connection are moved to the combined user plane function.

Preferably, re-routing user traffic to the combined user plane function is performed only whilst the UE is connected to, at least, the fixed-access telecommunications network.

Preferably, the cellular telecommunications network and the fixed-access telecommunications network are operated by the same network operator. Optionally, identifying inefficient routing comprises determining that the cellular telecommunications network and the fixed-access telecommunications network are operated by the same network operator. Optionally, said determining is performed by identifying whether the network addresses of each user plane function in the set of user plane functions are all provided within a telecommunications network that is operated by the same network operator.

Preferably, the network connection comprises a Multi-Access or Single-Access Packet Data Unit, (MA-PDU or SA-PDU) session.

Preferably, the method further comprises the steps of: providing a list of excluded access points; identifying that the network connection is established via an excluded access point; and preventing re-routing of the user traffic to the combined user plane function whilst the network connection is established via the excluded access point, despite identifying inefficient routing. Preferably, the list comprises access points for which the network connection is established for a period of time that is less than a threshold value.

According to another aspect of the invention, there is provided a computer-readable carrier medium comprising a computer program, which, when the computer program is executed by a computer, causes the computer to carry out a method as described above.

According to another aspect of the invention, there is provided a telecommunications network comprising: a cellular telecommunications network accessible to a User Equipment, UE; a fixed-access telecommunications network accessible to the UE; a set of user plane functions for processing user traffic for the UE, said set comprising at least one user plane function in each of the cellular and the fixed-access telecommunications networks; a combined user plane function for processing user traffic for the UE, at least, according to the set of user plane functions; a processor configured to identify, following establishment of a network connection between the UE and the cellular telecommunications network via the fixed-access telecommunications network, inefficient routing of user traffic associated with the UE, said inefficient routing comprising routing user traffic to at least the set of user plane functions; and a controller configured to, in response to identifying inefficient routing, re-route user traffic associated with the UE to the combined user plane function so as to process the user traffic at the combined user plane function instead of at the set of user plane functions.

Optionally, the processor is provided as part of the combined user plane function. Optionally, the processor is provided in-line with the user traffic. Optionally, the processor is provided out-of-band with the user traffic. Optionally, the processor is provided as part of the set of user plane functions.

Optionally, the processor is provided as part of the cellular telecommunications network. Optionally, the processor is provided as part of the fixed-access telecommunications network.

The invention includes any novel aspects described and/or illustrated herein. The invention also extends to methods and/or apparatus substantially as herein described and/or as illustrated with reference to the accompanying drawings. The invention is also provided as a computer program and/or a computer program product for carrying out any of the methods described herein and/or for embodying any of the apparatus features described herein, and a computer-readable medium storing thereon a program for carrying out any of the methods and/or for embodying any of the apparatus features described herein. Features described as being implemented in hardware may alternatively be implemented in software, and vice versa.

The invention also provides a method of transmitting a signal, and a computer product having an operating system that supports a computer program for performing any of the methods described herein and/or for embodying any of the apparatus features described herein.

Any apparatus feature may also be provided as a corresponding step of a method, and vice versa. As used herein, means plus function features may alternatively be expressed in terms of their corresponding structure, for example as a suitably-programmed processor.

Any feature in one aspect of the invention may be applied, in any appropriate combination, to other aspects of the invention. Any, some and/or all features in one aspect can be applied to any, some and/or all features in any other aspect, in any appropriate combination. Particular combinations of the various features described and defined in any aspects of the invention can be implemented and/or supplied and/or used independently.

As used throughout, the word 'or' can be interpreted in the exclusive and/or inclusive sense, unless otherwise specified.

The invention extends to a method of operating a telecommunications network and to a telecommunications network as described herein and/or substantially as illustrated with reference to the accompanying drawings. The present invention is now described, purely by way of example, with reference to the accompanying diagrammatic drawings, in which:

SPECIFIC DESCRIPTION

Figure 2:
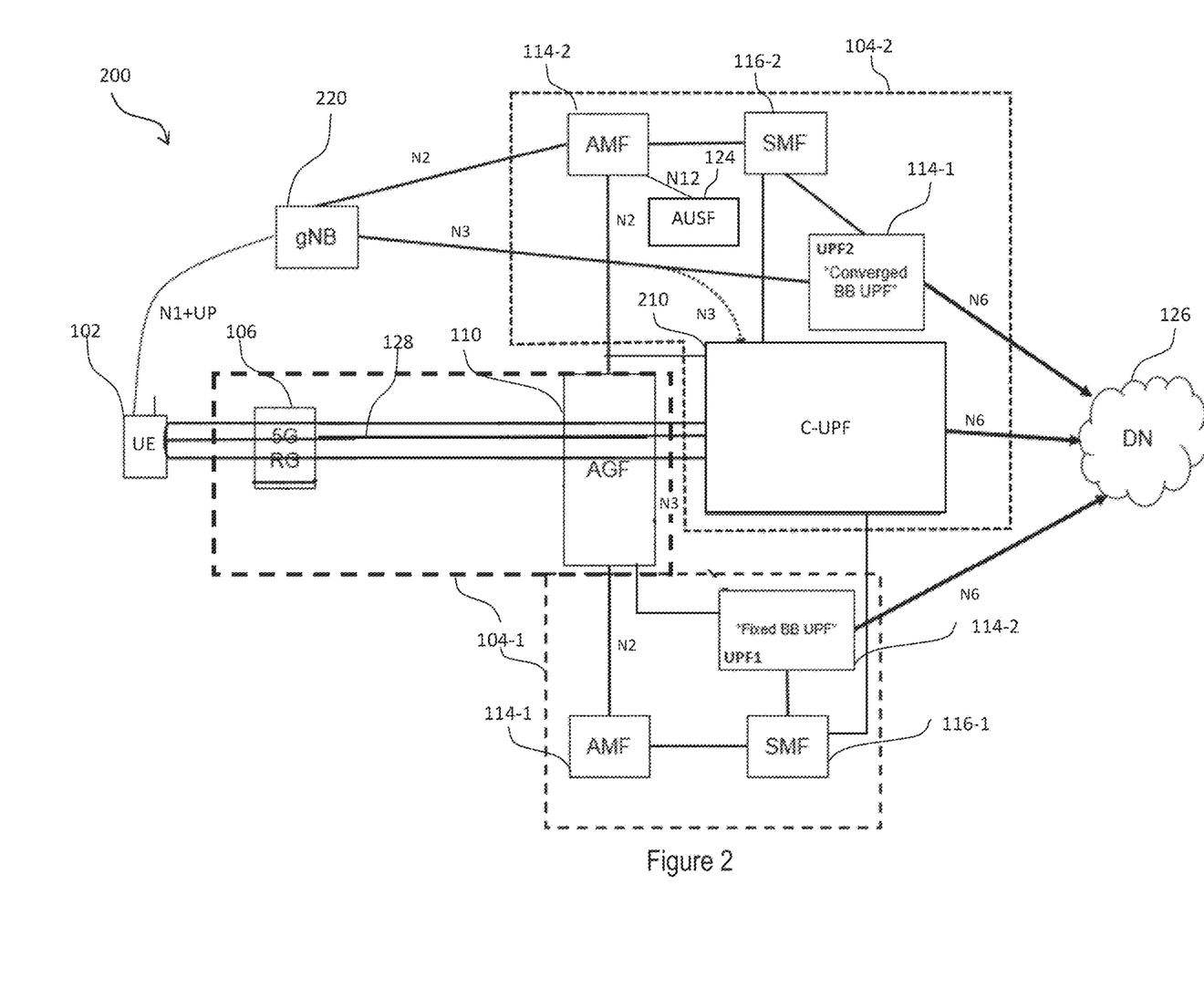
FIG. 2 shows a modified telecommunications network.

FIG. 2 is a schematic diagram showing a portion of a modified 5G-based telecommunications network 200. The telecommunications network 200 comprises the same network components of telecommunications network 100 show in, and described with reference to, FIG. 1 (for brevity these network components are not exhaustively described here, nor reproduced in full in FIG. 2).

The UE 102 is available to access the telecommunications network 200 by means of the RG 106 and/or a gNodeB access point 220 (i.e. a form of 3GPP access point).

For access to the non-3GPP network portion 104-1, the UE connects to the RG 106, which in turn connects through a fixed access network to the AGF 110.

The telecommunications network 200 further comprises a Combined User Plane Function (C-UPF) 210 that is provided as part of the 3GPP network portion 104-2, and specifically as part of the Service Based Architecture (SBA) service bus therein. The C-UPF is provided as a separate user plane function (and in addition) to the AGF 110, FBB UPF 112-1, N3IWF 122, and CBB UPF 112-2 user plane functions (not shown in FIG. 2 for brevity).

The C-UPF is provided and utilised so as to improve the efficiency with which user traffic is processed compared to telecommunications network 100. In overview, to achieve this, in dependence upon the telecommunications network 200 identifying inefficient routing of user traffic through multiple user plane functions, the telecommunications network 200 is configured to route user traffic to the C-UPF 210 instead, bypassing said multiple user plane functions.

As used herein, the term "inefficient routing" connotes routing of user traffic associated with the UE 102 sequentially through a plurality of separate user plane functions, and in particular through a chain of user plane functions that includes at least one user plane function in both the non-3GPP 104-1 and the 3GPP 104-2 network portions.

As such, routing of user traffic via the AGF 110, FBB UPF 112-1, N3IWF 122 and CBB UPF 112-2 (as shown in, and described with reference to, FIG. 1) is an example (but not a sole example) of inefficient routing. The inefficiency of such routing arises because there is a duplication of processing that is performed by each user plane function as part of transporting user traffic multiple times (i.e. five) to, between and then from the user plane functions. Furthermore, separate user plane functions might not be geographically co-located, which may therefore increase latency.

The C-UPF is a user plane function configured to processes user traffic associated with the UE 102. In particular, the C-UPF is configured to perform, at least, the same processing of user traffic that is available to be performed by the user plane functions in both the non-3GPP 104-1 and 3GPP 104-2 networks that are collapsed into the singular C-UPF.

Figure 3:
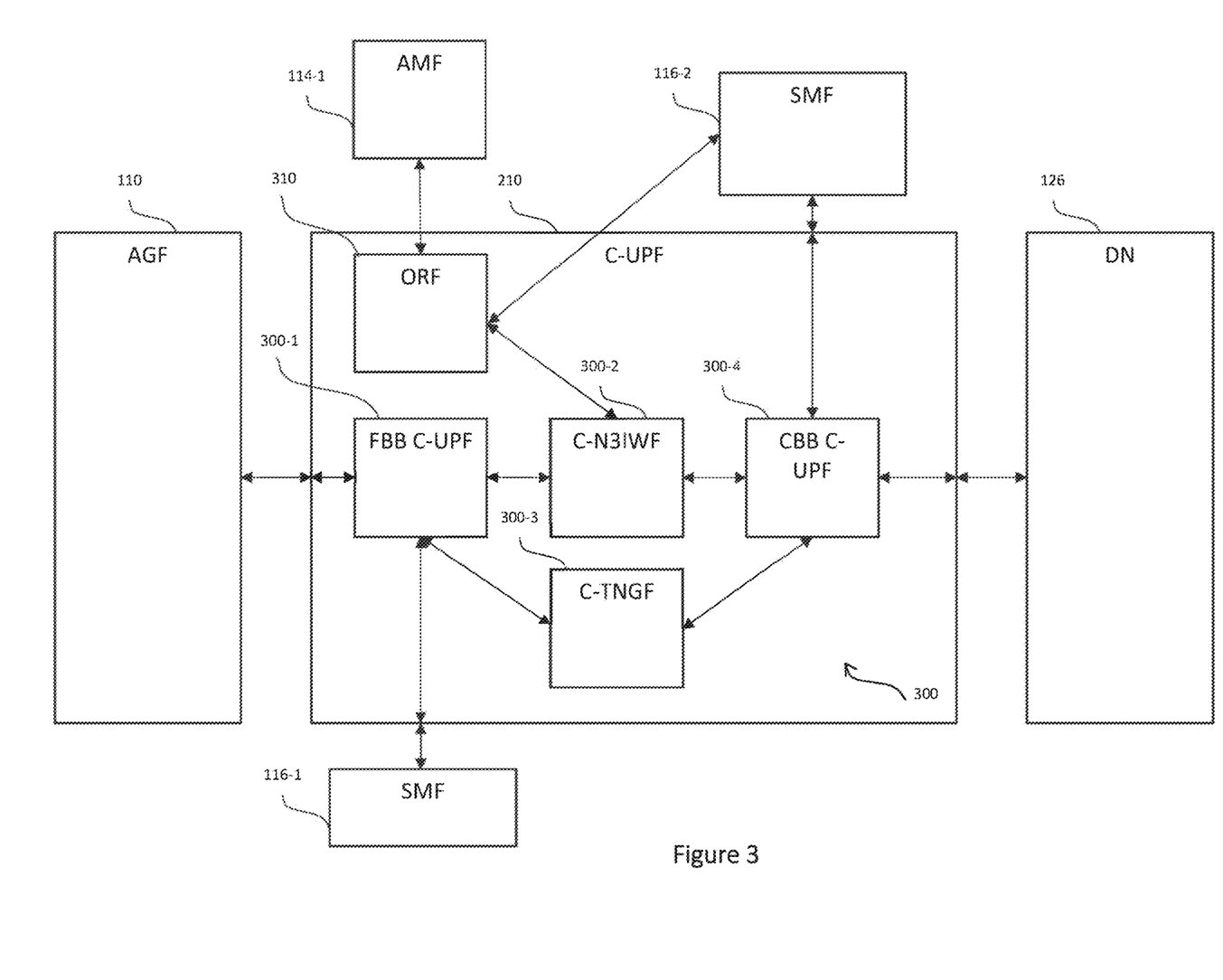
FIG. 3 shows a detailed view of the modified telecommunications network.

FIG. 3 shows a detailed schematic view of an example of the C-UPF, in which the C-UPF 210 comprises the following network sub-functions 300, a:

FBB C-UPF 300-1, which has the same processing capabilities of user traffic as the FBB UPF 112-1;

C-N3IWF 300-2, which has the same processing capabilities of user traffic as the N3IWF 122;

C-TNGF 300-3, which has the same processing capabilities of user traffic as the TNGF; and CBB C-UPF 300-4, which has the same processing capabilities of user traffic as the CBB UPF 112-2.

The processing capabilities of the network sub-functions 300 include, at least: network (IP) addressing; routing; traffic handling; deep packet inspection; and monitoring usage and network metrics.

User traffic that is received at the C-UPF 210 is processed sequentially by the: FBB C-UPF; C-N3IWF or C-TNGF (depending on whether UE network access is an untrusted or trusted, respectively); and CBB C-UPF.

The C-UPF is provided with interfaces for the: AGF 110; AMF 114-1; DN 104; and each SMF 116. Specifically, a single interface is provided for the C-UPF 210 and the AGF 110, such as in the form of an N3 interface (and therefore capable of supporting a Generic Tunnelling Protocol (GTP) tunnel). Another interface is also provided for the C-UPF 210 and the DN 126, such as in the form of an N6 interface.

Since the sub-functions 300 are provided as part of the C-UPF, user traffic is available to be processed by any multiple of the sub-functions 300 without having to perform as much processing for transportation (e.g. encapsulation, decapsulation, buffering and establishing tunnels) as between the AGF 110, FBB UPF 112-1, N3IWF 122 and CBB UPF 112-2, thereby reducing the overall amount of processing resources used for this purpose. Instead, user traffic need only be communicated between the AGF 110, C-UPF and then on to the DN in order to complete processing of user traffic.

The (N4) interface between the C-UPF and the SMF 116-1 allows for communication of control plane data to the C-UPF, which is available to be communicated within the C-UPF to the FBB C-UPF 300-1, thereby to control operation of the FBB C-UPF. Correspondingly, the (N4) interface between the C-UPF and the CBB SMF 116-2 allows for the communication of control plane data to the C-UPF, which is available to be communicated within the C-UPF to the CBB C-UPF 300-4, thereby to control operation of the CBB C-UPF.

In the example of FIG. 3, the C-UPF also comprises an Optimal Routing Function (ORF) 310, which is configured to identify inefficient routing, and then to trigger (or orchestrate) re-routing of user plane traffic to the C-UPF instead. The ORF is in communication with the AMF 114-1, SMF 116-2 and C-N3IWF 300-2.

Figure 4:
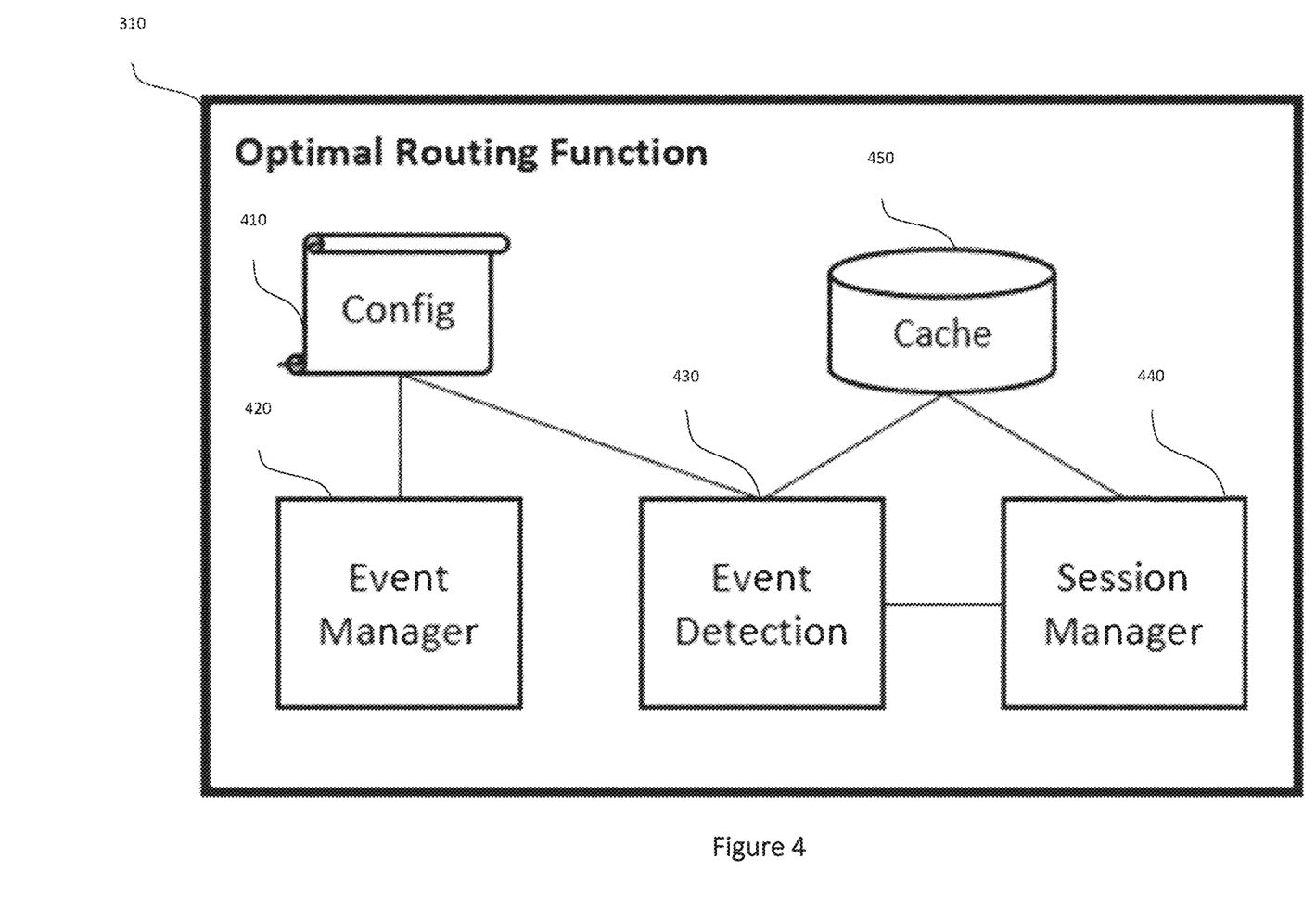
FIG. 4 shows a further detailed view of the modified telecommunications network.

FIG. 4 is a detailed schematic diagram of the ORF 220, which comprises:

a configuration database 410 for storing a list of network components to which the ORF is subscribed for event notifications;

an event manager 420 configured to subscribe to events from network components (e.g. AMF 114-1, SMF 116-2, etc.), and in particular control plane functions from which signalling may be received;

an event detection function 430 for receiving information and events from network components and to process such information and events so as to determine whether there is inefficient routing of user traffic associated with a specific UE;

a session manager 440, which is configured to cause re-routing of user traffic to the C-UPF 210; and an identifier database (or cache) 450, which is configured to store network addresses of network components and to identity information of active sessions utilising the C-UPF 210.

Figure 5:
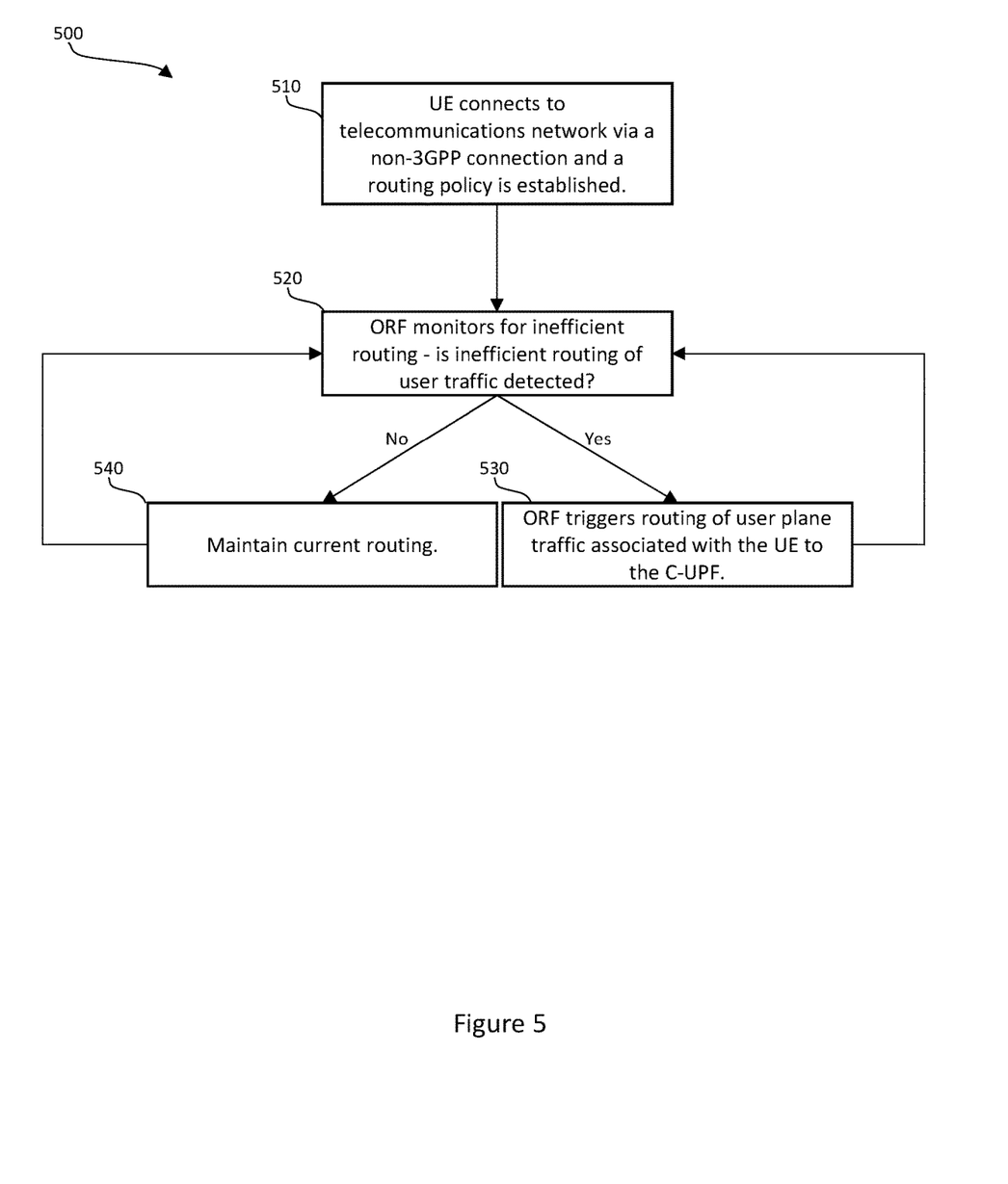
FIG. 5 shows a process for routing user traffic in the modified telecommunications network.

FIG. 5 shows a process 500 for operating the telecommunications network 200 so as selectively to route user traffic to the C-UPF.

In a first step 510, the UE 102 establishes a non-3GPP network connection with the telecommunications network 200 via the RG 106, and an initial routing policy for routing user traffic through the network is established.

For the non-3GPP network portion 104-1, the initial routing policy is established by the RG 106, which contains operator policy (UE Route Selection Policy, URSP). For the 3GPP network portion 104-2, the initial routing policy is established by an Access Traffic Steering, Switching & Splitting (ATSSS) function.

In this example (as described in relation to FIG. 1), the initial routing policy is established to route user traffic through the AGF 110, FBB UPF 112-1, N3IWF 122 and then CBB UPF 112-2. The initial routing policy does not include routing through the C-UPF. The identifier database 450 receives and stores, against the identity of the UE 102 (and optionally the RG 106), the initial routing policy, including the identity of a Multi-Access PDU Session Anchor (MA-PSA) as part of this initial routing policy.

At a next step 520 the ORF monitors for inefficient routing of user plane traffic associated with the UE 102.

In one example, in order to detect inefficient routing, the ORF is configured to identify routing (pre-emptively or responsively) of user traffic to the N3IWF 122, since this is evidence of routing via user plane functions in both the 3GPP and non-3GPP networks 104, and therefore of routing via multiple user plane functions.

When the UE 102 connects to the untrusted non-3GPP network 104-1, the tunnel 128 is established between the UE and the N3IWF 122. To establish the tunnel 128, a network address of the N3IWF 122 is identified (for example, using a DNS lookup of the Fully Qualified Domain Name, FQDN) and a MA-PDU Establishment Request (as described in 3GPP Technical Specification 23.502, Version 16.6.0, § 4.2.3.2, the contents of which are herein incorporated by reference) is issued. Accordingly, the ORF is configured to identify establishment of the tunnel 128. For example, this is performed by configuring the event manager 420 to subscribe to event notifications from the N3IWF, and the event detection function 430 identifying inefficient routing in response to receiving, from the N3IWF, the identity of the UE 102 for which MA-PDU Session establishment events are generated. Furthermore, the ORF is configured also to identify when, following establishment of the tunnel 128, the tunnel also traverses the FBB UPF 112-1, for example by also subscribing to event notifications from the FBB UPF 112-1.

Advantageously, by identifying routing to the N3IWF 122, inefficient routing is available to be pre-emptively identified before any actual inefficient routing of user traffic is performed.

Once processing has been performed to identify inefficient routing, if the ORF detects inefficient routing at step 520, the session manager 440 triggers re-routing of user traffic such that user traffic (for both fixed and cellular network traffic) is routed to the C-UPF 430, rather than as per the initial routing policy. For example, re-routing is triggered by having the session manager 440 issue a service request to move a MA-PDU session associated with the UE to the C-UPF, so that the C-UPF is the Multi-Access PDU Session Anchor (MA-PSA).

If the ORF detects that there is no inefficient routing, then the telecommunications network maintains a current routing policy 540, which is the initial routing policy in a first iteration of process 500.

After steps 530 or 540, process 500 re-iterates to step 520 so that the ORF continues to monitor for inefficient routing.

In one example, after step 530, process 500 is available to restore routing according to the initial routing policy after the UE leaves the non-3GPP network portion 104-1 (e.g. as detected by the event detection function 430, and for example as a result of a connection timeout). Accordingly, the session manager 440 triggers termination of routing to the C-UPF and triggers user traffic to be routed according to the initial routing policy (as retrieved from the identifier database 450) instead.

In one example, the ORF (in particular, for example, the identifier database 450) stores identities of RGs that are blacklisted, such that routing to the C-UPF is prevented for all user traffic from a UE that is connected to a blacklisted RG. This may be desirable so as to prevent network processing to establish re-routing to the C-UPF for transient (short-lived) connections where inefficient routing might occur, but where no or very limited user traffic will actually be inefficiently routed (e.g. an RG providing a public WLAN hotspot). Upon detecting a connection from a blacklisted RG, the ORF prevents routing to the C-UPF (e.g. by preventing progression to step 520 or 530). In one example, the blacklist is automatically populated by identifying an RG for which UEs are, on average, only connected to the telecommunications network (and in particular only whilst there is inefficient routing) for a period of time less than a pre-determined threshold period of time. Correspondingly, an RG is available to be depopulated from the blacklist when the period of time exceeds the pre-determined threshold.

In another example, preventing routing to the C-UPF for a UE connected to a blacklisted RG is available to be overridden after a UE has been connected to the telecommunications network (and in particular whilst there has been inefficient routing) via a blacklisted RG for a period of time in excess of the pre-determined threshold period of time.

Alternatives and Modifications

The ORF is available to be provided in-line (such that user traffic traverses through the ORF) and/or out-of-band (such that user traffic does not traverse through the ORF, but the ORF is instead a subscriber of event notifications in relation to the user traffic) by appropriately arranging the ORF within the telecommunications network.

In an alternative example, rather than the ORF forming part of (and only part of) the C-UPF, the ORF is provided as part of: a, several, or each user plane function (including a control plane function, such as a SMF 116); as a standalone functional component of the non-3GPP network portion 104-1 and/or 3GPP network portion 104-2; and/or the RG. As such, in some examples, the ORF is available to be distributed across various components of the telecommunications network 200.

Providing the ORF separately to the C-UPF is particularly advantageous where the UE is available to connect via one of a plurality of N3IWFs.

In one example, the ORF is available to form part of the N3IWF, advantageously the ORF is therefore in-line with user traffic, and therefore need not necessarily subscribe to event notifications in order to identify inefficient routing.

In another example of the processing available to be performed at step 520, at least, the FBB UPF 114-2 is configured to append a tag to user traffic. The tag is intelligible to the telecommunications network 200 as an indication that specific user traffic has been processed by the FBB UPF 114-2. Accordingly, where the user traffic having a tag indicative that the user traffic has traversed, at least, the UPF 114-2, the ORF is available to determine (e.g. by integrating the ORF as part of the N3IWF or by receiving, at the ORF, a notification from the N3IWF that user traffic with such a tag has been received by the N3IWF) that there is inefficient routing.

The telecommunications network (e.g. the CBB UPF 112-2 or the C-UPF 210) is available to remove tags appended to user traffic prior to such traffic being communicated outside of the telecommunications network 200.

In an alternative example to process 500, step 520 is available to be omitted such that the ORF instead routes user traffic to the C-UPF by default instead of only when having (definitively) identified inefficient routing, as part of a heuristic solution. To improve the chance that routing to the C-UPF is performed only when there is inefficient routing, the ORF may use information (and in particular historical information of instances of inefficient routing) associated with the UE and/or RG as a proxy for identifying a likelihood of inefficient routing.

In the aforementioned, the UE is shown accessing the telecommunications network using untrusted access, resulting in a connection with the N3IWF. In an alternative, UE is available to connect to the telecommunications network 200 using trusted access, in which case the RG 106 is a Trusted Network Access Point (TNAP) for the telecommunications network; in this example, the UE instead establishes a connection with a Trusted Network Gateway Function (TNGF).

In one example, where a network connection for the UE traverses only one of the network portions 104, the MA-PDU is replaced by a SA-PDU.

Each feature disclosed herein, and (where appropriate) as part of the claims and drawings may be provided independently or in any appropriate combination.

Any reference numerals appearing in the claims are for illustration only and shall not limit the scope of the claims.

The invention claimed is:

1. A method of operating a telecommunications network, said telecommunications network being accessible to a User Equipment, UE, and comprising a cellular telecommunications network and a fixed-access telecommunications network, the method comprising the steps of:
   providing a set of user plane functions for processing user traffic for the UE, said set comprising at least two user plane functions;
   providing a combined user plane function for processing user traffic for the UE according to the set of user plane functions;

following establishing a network connection between the UE and the cellular telecommunications network via the fixed-access telecommunications network, identifying inefficient routing of user traffic associated with the UE, said inefficient routing comprising routing user traffic to at least the set of user plane functions;

in response to identifying inefficient routing, re-routing user traffic associated with the UE to the combined user plane function so as to process the user traffic at the combined user plane function instead of at the set of user plane functions.

2. A method according to claim 1, wherein the set of user plane functions comprises one user plane function in each of the cellular and the fixed-access telecommunications networks.

3. A method according to claim 1, wherein the combined user plane function is provided only as part of the cellular telecommunications network.

4. A method according to claim 1, wherein the fixed-access telecommunications network comprises an Access Gateway Function, AGF, and wherein the combined user plane function comprises an interface with said AGF for communicating user traffic.

5. A method according to claim 1, wherein the cellular telecommunications network comprises a Data Network, DN, and wherein the combined user plane function comprises an interface with said DN for communicating user traffic.

6. A method according to claim 1, wherein the cellular telecommunications network comprises a Non-3GPP Interworking Function, N3IWF, and/or a Trusted Network Gateway Function, TNGF, and wherein identifying inefficient routing comprises identifying addressing of the user traffic to the N3IWF or TNGF.

7. A method according to claim 1, wherein the fixed-access telecommunications network and the cellular telecommunications network each comprise a User Plane Function, UPF, and wherein the set of user plane functions comprises at least one of said User Plane Functions.

8. A method according to claim 1, wherein the step of identifying inefficient comprises identifying a destination and/or a source within the telecommunications network of the user traffic.

9. A method according to claim 1, wherein the step of identifying inefficient is performed prior to transmitting the user traffic according to the identified inefficient routing.

10. A method according to claim 1, further comprising the steps of:
transmitting the user traffic to the set of user plane functions;
tagging user traffic with a unique tag by at least one of the user plane functions in the set; and
wherein identifying inefficient routing comprises identifying the presence of the tag/s.

11. A method according to claim 1, wherein re-routing to the combined user plane function comprises moving a session anchor associated with the user traffic for the UE from the set of user plane functions to the combined user plane function.

12. A method according to claim 1, wherein re-routing user traffic to the combined user plane function is performed only whilst the UE is connected to, at least, the fixed-access telecommunications network.

13. A method according to claim 1, wherein the cellular telecommunications network and the fixed-access telecommunications network are operated by the same network operator.

14. A method according to claim 1, wherein the network connection comprises a Multi-Access Packet Data Unit, MA-PDU, session.

15. A method according to claim 1, further comprising the steps of:
providing a list of excluded access points;
identifying that the network connection is established via an excluded access point; and
preventing re-routing of the user traffic to the combined user plane function whilst the network connection is established via the excluded access point, despite identifying inefficient routing.

16. A non-transitory computer-readable carrier medium comprising a computer program, which, when the computer program is executed by a computer, causes the computer to carry out the steps of claim 1.

17. A telecommunications network comprising:
a cellular telecommunications network accessible to a User Equipment, UE;
a fixed-access telecommunications network accessible to the UE;
a set of user plane functions for processing user traffic for the UE, said set comprising at least one user plane function in each of the cellular and the fixed-access telecommunications networks;
a combined user plane function for processing user traffic for the UE, at least, according to the set of user plane functions;
a processor configured to identify, following establishment of a network connection between the UE and the cellular telecommunications network via the fixed-access telecommunications network, inefficient routing of user traffic associated with the UE, said inefficient routing comprising routing user traffic to at least the set of user plane functions;
and a controller configured to, in response to identifying inefficient routing, re-route user traffic associated with the UE to the combined user plane function so as to process the user traffic at the combined user plane function instead of at the set of user plane functions.

18. A telecommunications network according to claim 17, wherein the processor is provided as part of the combined user plane function.

19. A telecommunications network according to claim 17, wherein the processor is provided as part of the set of user plane functions.

20. A telecommunications network according to claim 17, wherein the processor is provided as part of the cellular telecommunications network.

21. A telecommunications network according to claim 17, wherein the processor is provided as part of the fixed-access telecommunications network.

* * * * *